(12) United States Patent
Lee et al.

(10) Patent No.: US 9,105,904 B2
(45) Date of Patent: Aug. 11, 2015

(54) COMPOSITE ANODE ACTIVE MATERIAL, ANODE AND LITHIUM BATTERY INCLUDING THE SAME, AND METHOD OF PREPARING COMPOSITE ANODE ACTIVE MATERIAL

(71) Applicant: Samsung SDI Co., Ltd., Yongin-si, Gyeonggi-Do (KR)

(72) Inventors: So-La Lee, Yongin (KR); Ui-Song Do, Yongin (KR); Chang-Su Shin, Yongin (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 238 days.

(21) Appl. No.: 13/830,765

(22) Filed: Mar. 14, 2013

(65) Prior Publication Data

US 2014/0079993 A1    Mar. 20, 2014

(30) Foreign Application Priority Data

Sep. 20, 2012 (KR) .................. 10-2012-0104614

(51) Int. Cl.
| | | |
|---|---|---|
| *H01M 4/583* | (2010.01) |
| *H01M 4/48* | (2010.01) |
| *H01M 4/485* | (2010.01) |
| *H01M 4/133* | (2010.01) |
| *H01M 4/1393* | (2010.01) |
| *H01M 4/1395* | (2010.01) |
| *H01M 4/1391* | (2010.01) |
| *H01M 4/04* | (2006.01) |
| *H01M 4/134* | (2010.01) |
| *H01M 4/131* | (2010.01) |
| *H01M 4/02* | (2006.01) |

(52) U.S. Cl.
CPC ............ *H01M 4/133* (2013.01); *H01M 4/0471* (2013.01); *H01M 4/1391* (2013.01); *H01M 4/1393* (2013.01); *H01M 4/1395* (2013.01); *H01M 4/131* (2013.01); *H01M 4/134* (2013.01); *H01M 2004/021* (2013.01); *Y02E 60/122* (2013.01)

(58) Field of Classification Search
None
See application file for complete search history.

(56) References Cited

U.S. PATENT DOCUMENTS

2010/0285359 A1* 11/2010 Hwang et al. .................. 429/219
2011/0183202 A1   7/2011 Lee et al.

FOREIGN PATENT DOCUMENTS

KR   10-2011-0088214 A   8/2011

\* cited by examiner

*Primary Examiner* — Cynthia K Walls
(74) *Attorney, Agent, or Firm* — Knobbe Martens Olson & Bear LLP

(57) ABSTRACT

In an aspect, a composite anode active material including particles, wherein the particles include: a first carbonaceous material that is substantially crystalline and includes at least one carbon nano-sheet; a non-carbonaceous material capable of intercalating and deintercalating lithium; and a second carbonaceous material that binds the first carbonaceous material and the non-carbonaceous material, wherein the particles have pores having a size of 50 nm or more is disclosed.

16 Claims, 6 Drawing Sheets

COMPOSITE ANODE ACTIVE MATERIAL, ANODE AND LITHIUM BATTERY INCLUDING THE SAME, AND METHOD OF PREPARING COMPOSITE ANODE ACTIVE MATERIAL

CROSS-REFERENCE TO RELATED APPLICATIONS

This application claims the benefit of Korean Patent Application No. 10-2012-0104614, filed on Sep. 20, 2012, in the Korean Intellectual Property Office, the disclosure of which is incorporated in its entirety herein by reference.

BACKGROUND

1. Field

One or more embodiments of the present disclosure relate to a composite anode active material, an anode and lithium battery including the composite anode active material, and a method of preparing the composite anode active material.

2. Description of the Related Technology

Lithium batteries are used in various applications due to their high voltage and high energy density characteristics. Lithium batteries for devices such as electric vehicles should be operable at high temperatures, be able to charge or discharge a large amount of electricity, and have long-term usability. Thus, they should have high thermal stability, high-rate characteristics, and a long lifetime.

Lithium batteries may include carbonaceous materials as an anode active material. Carbonaceous materials are porous and stable with little volumetric change during charging and discharging. However, carbonaceous materials may lead to a low-battery capacity due to the porous structure of carbon. For example, graphite in the form of $LiC_6$ has a theoretical capacity density of about 372 mAh/g.

Metals that are alloyable with lithium may be used as anode active materials with high electric capacity relative to carbonaceous materials. Examples of the metals that are alloyable with lithium include silicon (Si), tin (Sn), and aluminum (Al). However, these metals easily degrade, and thus batteries including such materials may have a relatively short lifetime. For example, degradation may occur with repeated charging or discharging of metals such as tin. The tin may be in the form of particles where aggregation and crushing of tin particles may be repeated, and thus, the Sn particles may be electrically shorted.

Additionally, lithium batteries may undergo thermal runaway due to short circuits.

Therefore, there is a need to develop lithium batteries with improved initial efficiency, discharge capacity, and lifetime characteristics.

SUMMARY

Some embodiments provide a composite anode active material including particles, wherein the particles include a first carbonaceous material, a non-carbonaceous material capable of intercalating and deintercalating lithium, and a second carbonaceous material, wherein the particles are porous.

Some embodiments provide an anode including a composite anode active material as disclosed and described herein.

Some embodiments provide a lithium battery including the composite anode as disclosed and described herein.

Some embodiments provide a method of preparing a composite anode active material as disclosed and described herein.

Additional aspects will be set forth in part in the description which follows and, in part, will be apparent from the description, or may be learned by practice of the presented embodiments.

Some embodiments provide a composite anode active material including particles, wherein the particles include: a first carbonaceous material that includes at least one carbon nano-sheet on a portion of a surface, wherein the first carbonaceous material is crystalline; a non-carbonaceous material capable of intercalating and deintercalating lithium; and a second carbonaceous material that binds the first carbonaceous material and the non-carbonaceous material, and wherein the particles have pores having a size of at least 50 nm.

Some embodiments provide an anode including the composite anode active material as disclosed and described herein.

Some embodiments provide a lithium battery that includes the anode as disclosed and described herein.

Some embodiments provide a method of preparing a composite anode active material, wherein the method includes preparing a mixture slurry by mixing a first carbonaceous material that includes at least one carbon nanosheet, wherein the first carbonaceous material is substantially crystalline, a non-carbonaceous material capable of intercalating and deintercalating lithium, a precursor of a second carbonaceous material, and a solvent; spray-drying the mixture slurry to obtain a dried product; and sintering the dried product to obtain the composite anode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, composite anode active materials according to exemplary embodiments of the present disclosure, anodes including the composite anode active materials, lithium batteries including the anodes, and methods of preparing the composite anode active materials will be described in detail with reference to the accompanying drawings.

Some embodiments provide a composite anode active material—including particles, wherein the particles include: a first carbonaceous material that includes at least one carbon nanosheet, wherein the first carbonaceous material is substantially crystalline; a non-carbonaceous material capable of intercalating and deintercalating lithium; and a second carbonaceous material that binds the first carbonaceous material and the non-carbonaceous material, wherein the particles include pores having a size of at least 50 nm. In some embodiments, the particles may include pores having a size of at least 100 nm. In some embodiments, the particles may include pores having a size of at least 500 nm. As used herein, the size of a pore indicates a linear distance between two points of the pore which are spaced apart farthest from each other. In some embodiments, the particles may include pores having a size of less than 20 μm. In some embodiments, the particles may include pores having a size of less than 10 μm. In some embodiments, the particles may include pores having a size of less than 5 μm. In some embodiments, the particles may have pores having a size of less than 1 μm. The second carbonaceous material may be an amorphous carbon or a crystalline carbon.

In some embodiments, the composite anode active material may include particles, wherein the particles include: a first carbonaceous material with crystallinity, a non-carbonaceous material capable of intercalating and deintercalating lithium, and a second carbonaceous material, wherein the particles have a plurality of large pores having a size of at least 50 nm. In some embodiments, the plurality of large pores may enable a change in the volume of the non-carbonaceous material to be tolerated during charging and discharging processes, and the first carbonaceous material may provide an improved conductivity, and thus, a lithium battery including the composite anode active material may have an improved initial efficiency, discharge capacity, and lifetime. In some embodiments, at least one carbon nanosheet may be formed on a portion of a surface of a first carbonaceous material particle. In some embodiments, a plurality of carbon nanosheets having a thickness may be formed on a portion of a surface of a first carbonaceous material particle. In some embodiments, a plurality of carbon nanosheets may be formed on a portion of a surface of a first carbonaceous material particle. In some embodiments, the thickness may be in a range of about 0.5 nm to about 90 nm, and more particularly, in a range of about 0.5 nm to about 50 nm. In some embodiments, the thickness may be in a range of about 0.5 nm to about 20 nm. In some embodiments, the first carbonaceous material may be a nanopowder having plate-shaped particles.

In some embodiments, the composite anode active material may include particles. In some embodiments, the particles may include pores having a size on the order of micrometers. In some embodiments, the particles may include pores having a size of at least 1 μm. In some embodiments, the particles may include pores having a size of at least 2 μm. In some embodiments, the particles may include pores having a size of at least 3 μm. In some embodiments, the particles may include pores having a size of at least 5 μm. In some embodiments, the particles may include pores having a size in the range of from 1 μm to about 20 μm. In some embodiments, the particles may include pores having a size of from about 2 μm to about 20 μm. In some embodiments, the particles may include pores having a size of from about 3 μm to about 20 μm. In some embodiments, the particles may include pores having a size of from about 4 μm to about 20 μm. In some embodiments, the particles may include pores having a size of from about 5 μm to about 20 μm.

In some embodiments, the particles may have irregular pores. That is, the particles may have pores with various shapes, including a circular shape.

For example, a cross section of the particles may be a non-spherical pore. The non-spherical pore may be a tube-type pore having an aspect ratio of at least 3.

At least a portion of the non-spherical pore may be defined by the first carbonaceous material. For example, as shown in FIG. 1C, a non-spherical pore may be formed between two carbon nanosheets as the first carbonaceous material so that the sidewalls of the non-spherical pore may be comprised of the first carbonaceous material. In some embodiments, the sidewalls of the non-spherical pore may be formed such that the second carbonaceous material is coated thin on a surface of the first carbonaceous material.

In some embodiments, pores may be formed on a surface of the particles. In some embodiments, a plurality of carbon nanosheets may be formed on a portion of a surface of the particles.

In some embodiments, at least a portion of the pore formed on the surface of the particle may be defined by the first carbonaceous material. For example, as shown in FIG. 1B, a plurality of carbon nanosheets as the first carbonaceous material alternately overlap with one another so that pores exposed at the surface of the particle may be formed between the carbon nanosheets, which are in the form of plates.

In some embodiments, a tap density of the particles may be 1 g/cm$^3$ or less. In some embodiments, the tap density of the particles may be from about 0.4 g/cm$^3$ to about 1 g/cm$^3$. In some embodiments, the tap density of the particles may be from about 0.6 g/cm$^3$ to about 0.8 g/cm$^3$. When the tap density of the particles is too low, a mass density of the particles included in a battery decreases, and thus, an electric capacity of the battery may be reduced. In contrast, when the tap density of the particles is too large, the mass density thereof may be excessively large.

In some embodiments, a Brunauer-Emmett-Teller (BET) specific surface area of the particles may be 5 m$^2$/g or more. In some embodiments, the BET specific surface area of the particles may be from about 5 m$^2$/g to about 60 m$^2$/g. In some embodiments, the BET specific surface area of the particles may be from about 20 m$^2$/g to about 60 m$^2$/g.

In some embodiments, an average particle diameter (D50) of the particles may be at least 10 μm. In some embodiments, the D50 of the particles may be from about 10 μm to about 100 μm. In some embodiments, the D50 of the particles may be from about 10 μm to about 60 μm. In some embodiments, the D50 of the particles may be from about 10 μm to about 40 μm. In some embodiments, the D50 of the particles may be from about 10 μm to about 20 μm. When the D50 of the particles is too small, it may be difficult to prepare an active material slurry by using a composite anode active material including the particles and coat the composite anode active material including the particles on a plate. In contrast, when the D50 of the particles is too large, a coating layer prepared may be not uniform or high-rate characteristics may be reduced.

In some embodiments, the particles may be spherical or oval particles having an aspect ratio of 3 or less. In some embodiments, the particles may be spherical particles having an aspect ratio of less than 2. In some embodiments, the particles may be spherical particles having an aspect ratio in a range of about 2 to about 1. In some embodiments, the particles may be spherical particles having an aspect ratio in a range of from about 1.5 to about 1. In some embodiments it may be easy to disperse a slurry including the particles and the strength of a plate may be increased for particles having a spherical shape.

In some embodiments of the composite anode active material, the first carbonaceous material and the non-carbonaceous material capable of intercalating and deintercalating lithium may be dispersed in a particle. In some embodiments, the first carbonaceous material and the non-carbonaceous material may be dispersed in the particle such that they are bonded together by the second carbonaceous material and non-spherical pores may be present therebetween.

In some embodiments, the amount of the non-carbonaceous material capable of intercalating and deintercalating lithium in the composite anode active material may be from more than 0 to about 50 wt % based on a total weight of the particles. In some embodiments, the amount of the non-carbonaceous material may be from more than 0 to about 40 wt %, from more than 0 to about 30 wt %, from more than 0 to about 20 wt %, from more than 0 to about 10 wt %. In some embodiments, the amount of the non-carbonaceous material may be from more than 1 wt % to about 40 wt %, from more than 1 wt % to about 30 wt %, from more than 1 wt % to about 20 wt %, from more than 1 wt % to about 10 wt %. When the amount of the non-carbonaceous material capable of intercalating and deintercalating lithium is too large, cracks may occur in the prepared active material due to a volumetric change of the non-carbonaceous material during charging and discharging.

In some embodiments, the non-carbonaceous material capable of intercalating and deintercalating lithium of the composite anode active material may be particles having a diameter in the range of from about 10 nm to about 5 μm. In some embodiments, the non-carbonaceous material capable of intercalating and deintercalating lithium may be particles having a diameter in the range of about 10 nm to about 1 μm. In some embodiments, the non-carbonaceous material capable of intercalating and deintercalating lithium may be particles having a diameter in the range of about 10 nm to about 500 nm. In some embodiments, the non-carbonaceous material capable of intercalating and deintercalating lithium may be particles having a diameter in the range of about 10 nm to about 100 nm. When the particle diameter of the non-carbonaceous material capable of intercalating and deintercalating lithium is too small, a surface of the composite anode active material may be easily oxidized. In contrast, when the particle diameter of the non-carbonaceous material capable of intercalating and deintercalating lithium is too large, cracks may occur in the composite anode active material due to a volumetric change of the non-carbonaceous material during charging and discharging.

In some embodiments of the composite anode active material, the non-carbonaceous material capable of intercalating and deintercalating lithium may include at least one selected from the group consisting of metals that are alloyable with lithium, alloys of the metals, and oxides of the metals.

In some embodiments, the non-carbonaceous material capable of intercalating and deintercalating lithium may include at least one selected from the group consisting of Si, Sn, Pb, Ge, Al, SiOx (0<x≤2), $Li_4Ti_5O_{12}$, $TiO_2$, $LiTiO_3$, and $Li_2Ti_3O_7$.

In some embodiments of the composite anode active material, the first carbonaceous material has crystallinity.

In some embodiments of the composite anode active material, the first carbonaceous material with crystallinity has a structure in which n polycyclic nano-sheets are stacked upon one another along a direction perpendicular to one plane, wherein each of the polycyclic nano-sheets includes a carbocyclic rings having six carbon atoms, the rings being fused to one another in a plane. In some embodiments, n of the polycyclic nano-sheets may be an integer from 2 to 250. In addition, when a first carbon among carbons of the n polycyclic nano-sheets and a second carbon among carbons of the n polycyclic nano-sheets are selected to satisfy the condition L1≥L2, and the first carbon is positioned at the origin A(0, 0, 0) of a three-dimensional coordinate system having x-, y-, and z-axes, the second carbon has a coordinate B(p, q, r), where p and q may be each independently 10 μm or less, and r may be 100 nm or less. In this regard, L1 denotes a distance between the first carbon and the second carbon, and L2 denotes a distance between an arbitrary third carbon, among carbons of the n polycyclic nano-sheets excluding the first and second carbons, and an arbitrary fourth carbon among carbons of the n polycyclic nano-sheets excluding the first, second, and third carbons.

Figure 6:
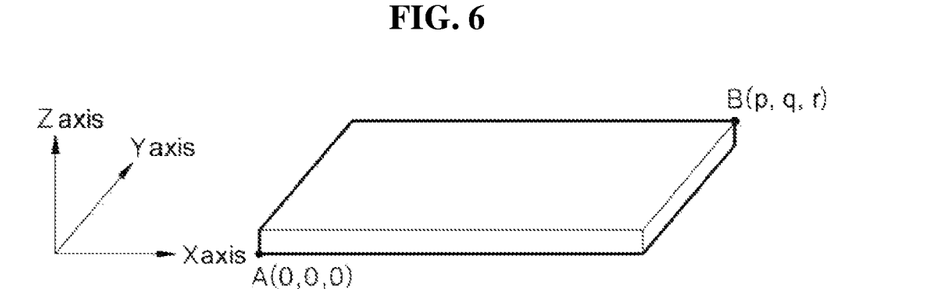
FIG. 6 shows an example of a planar shape wherein a length of one dimension is far shorter than those of other two dimensions.

In some embodiments, the first carbonaceous material with crystallinity may have an irregular shape, but basically has a "plate shape." The planar shape refers to a shape wherein a length of one dimension is far shorter than those of other two dimensions such as FIG. 6. However, the shape of the first carbonaceous material is not limited thereto, and the first carbonaceous material may have various modified shapes such as a bent shape or a shape having a curled end portion. The fact that the shape of the first carbonaceous material with crystallinity is basically a "plate" shape may be easily understood from an image of the first carbonaceous material with crystallinity shown in FIG. 2A.

As used herein, the phase "carbocyclic rings having six carbon atoms" denotes a rings in which carbons are positioned at each vertex of a hexagon. Hereinafter, the aforementioned ring may also be referred to as "6-membered carbon ring." A polycyclic nanosheet has a plurality of 6-membered carbon rings arranged within a plane. As used herein, the phrase "arranged on one plane" indicates that the plurality of 6-membered carbon rings are in an atomic-scale honeycomb lattice made of carbon atoms.

Adjacent carbons among the carbons of the polycyclic carbon nano-sheets may be connected to each other by an $sp^2$ bond. Thus, a resonance structure may be formed in the 6-membered carbon rings, thereby facilitating migration of electrons.

Since a polycyclic carbon nano-sheet has a structure in which the plurality of 6-membered carbon rings are arranged within a plane, the thickness of the polycyclic carbon nano-sheet may be, for example, in a range of a carbon atom diameter of ±1 nm. In some embodiments, the polycyclic carbon nano-sheet may have a bent shape or a shape having a curled end portion or may be partially damaged.

As described above, the first carbonaceous material with crystallinity may have a structure in which the n polycyclic nano-sheets are stacked. Herein, the n polycyclic nano-sheets are stacked along a direction perpendicular to a plane where the plurality of 6-membered carbon rings are in an atomic-scale honeycomb lattice made of carbon atoms.

In some embodiments, the n of the polycyclic nano-sheets may be an integer of 2 to 100. In some embodiments, n may be an integer between 2 and 80, for example, between 2 and 70, for example, between 2 and 40. In some embodiments, n may be between 2 and 20, and for example, between 2 and 10.

In the first carbonaceous material with crystallinity, when a first carbon among carbons of the n polycyclic nano-sheets and a second carbon among carbons of the n polycyclic nano-sheets are selected to satisfy the condition $L1 \geq L2$, and the first carbon is positioned at the origin A(0, 0, 0) of a three-dimensional coordinate system having x-, y-, and z-axes, the second carbon has a coordinate B(p, q, r), where p and q may be each independently 10 μm or less, and r may be 100 nm or less. In this regard, L1 denotes a distance between the first carbon and the second carbon, and L2 denotes a distance between an arbitrary third carbon, among carbons of the n polycyclic nano-sheets excluding the first and second carbons, and an arbitrary fourth carbon among carbons of the n polycyclic nano-sheets excluding the first, second, and third carbons. That is, it may be understood that the first carbon and the second carbon are two carbons selected to have the longest distance between carbons among the carbons included in the n polycyclic nano-sheets.

In the coordinate B(p, q, r), p and q may be each independently 10 μm or less, for example, between about 0.1 μm and about 10 μm. For example, p and q may be each independently in a range of about 1 μm to about 10 and for example, in a range of about 6 μm to about 10 μm. In this regard, p and q may be width and length, respectively, in directions perpendicular to a thickness direction of the first carbonaceous material with crystallinity.

In the coordinate B(p, q, r), r may be 100 nm or less, and for example, in a range of about 0.5 nm to about 100 nm. In particular, r may be in a range of about 0.5 nm to about 90 nm, and more particularly, in a range of about 0.5 nm to about 50 nm. In some embodiments, r may be in a range of about 0.5 nm to about 20 nm, but is not limited thereto. For example, the first carbonaceous material with crystallinity may be a nano-powder having plate-shaped particles.

By p, q and r of the first carbonaceous material with crystallinity satisfying the above-described ranges, transfer of electrons or the like may be facilitated to thus obtain excellent conductivity, although the transfer is not limited to a particular theory.

In some embodiments of the composite anode active material, the first carbonaceous material may have a lattice spacing $d_{002}$ of about 0.330 nm to about 0.400 nm. In some embodiments, the lattice spacing $d_{002}$ of the first carbonaceous material may be in a range of about 0.350 nm to about 0.400 nm. In some embodiments, the lattice spacing $d_{002}$ of the first carbonaceous material may be in a range of about 0.350 nm to about 0.380 nm.

In some embodiments of the composite anode active material, the second carbonaceous material may include amorphous carbon. In some embodiments, the second carbonaceous material may be a sintered product of a carbon precursor. Any carbon precursor known in the art, which is sintered to prepare a carbonaceous material, may be used. In some embodiments, the carbon precursor may be at least one selected from the group consisting of a polymer, coal tar pitch, petroleum pitch, mesophase pitch, coke, low molecular weight heavy oil, a coal-based pitch, and derivatives thereof.

In addition, a carbon-based coating layer may be further formed on the particle in the composite anode active material. In some embodiments, the carbon-based coating layer may include amorphous carbon. Due to the formation of the carbon-based coating layer on the particle, contact between the first carbonaceous material and an electrolyte may be prevented by the formation of a solid electrolyte interface (SEI) and the selective permeation of $Li^+$ ions.

Some embodiments provide an anode including a composite anode active material as disclosed and described herein. In some embodiments, the anode may be prepared by a method in which an anode active material composition containing the composite anode active material and a binder is formed in a certain shape, or the anode active material composition may be coated on a current collector such as a copper foil or the like.

In some embodiments, the anode may be prepared by a method in which the composite anode active material, a conductive agent, a binder, and a solvent are mixed together to form a mixture. In some embodiments, a negative plate may be prepared by directly coating the anode active material composition on a metal current collector. In some embodiments, the anode active material composition may be cast on a separate support, and then a negative plate may be prepared by laminating films detached from the support on a metal current collector. The anode is not limited to the foregoing shapes and may have any other shapes.

Examples of the conductive agent include acetylene black, Ketjen black, natural graphite, artificial graphite, carbon black, carbon fiber, and metal powder and metal fiber of, for example, copper, nickel, aluminum or silver. In some embodiments at least one conductive material such as polyphenylene derivatives may be used in combination. However, the conductive material is not limited thereto, and any conductive agent that may be used in the art may be used. In addition, the first carbonaceous material with crystallinity may be used as a conductive material.

Examples of the binder include, but are not limited to, a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Any material available as a binding agent in the art may be used.

In some embodiments, the solvent may be N-methylpyrrolidone, acetone, or water, but is not limited thereto. Any suitable solvent known in the art may be used.

The amounts of the composite anode active material, the conductive agent, the binder, and the solvent are those levels that are generally used in manufacturing a lithium battery. In some embodiments, at least one of the binder, and the solvent may not be included in the lithium battery.

According to another embodiment of the present disclosure, a lithium battery may include an anode including the composite anode active material as described herein. In some embodiments, the lithium battery may be manufactured in the following manner:

First, an anode may be prepared according to the above-described anode manufacturing method.

Next, a cathode active material, a conductive agent, a binder, and a solvent may be mixed to prepare a cathode active material composition. In some embodiments, the cathode active material composition may be directly coated on a metallic current collector and dried to prepare a cathode plate. In some embodiments, the cathode active material composition may be cast on a separate support to form a cathode active material film, which may then be separated from the support and laminated on a metallic current collector to prepare a cathode plate.

In some embodiments, the cathode active material may include at least one selected from the group consisting of lithium cobalt oxide, lithium nickel cobalt manganese oxide, lithium nickel cobalt aluminum oxide, lithium iron phosphorous oxide, and lithium manganese oxide. In some embodiments, the cathode active material is not limited to these examples, and may be any cathode active material available in the art.

In some embodiments, the cathode active material may be a compound selected from the group consisting of $Li_aA_{1-b}B^1_bD^1_2$ where $0.90 \le a \le 1.8$ and $0 \le b \le 0.5$; $Li_aE_{1-b}B^1_bO_{2-c}D^1_c$ where $0.90 \le a \le 1.8$, $0 \le b \le 0.5$, and $0 \le c \le 0.05$; $LiE_{2-b}B^1_bO_{4-c}D^1_c$ where $0 \le b \le 0.5$ and $0 \le c \le 0.05$; $Li_aNi_{1-b-c}Co_bB^1_cD^1_\alpha$ where $0.90 \le a \le 1.8$, $0 \le b \le 0.5$, $0 \le c \le 0.05$, and $0 < \alpha \le 2$; $Li_aNi_{1-b-c}Co_bB^1_cO_{2-\alpha}F^1_\alpha$ where $0.90 \le a \le 1.8$, $0 \le b \le 0.5$, $0 \le c \le 0.05$, and $0 < \alpha \le 2$; $Li_aNi_{1-b-c}Co_bB^1_cO_{2-\alpha}F^1_2$ where $0.90 \le a \le 1.8$, $0 \le b \le 0.5$, $0 \le c \le 0.05$, and $0 < \alpha \le 2$; $Li_aNi_{1-b-c}Mn_bB^1_cD^1_\alpha$ where $0.90 \le a \le 1.8$, $0 \le b \le 0.5$, $0 \le c \le 0.05$, and $0 < \alpha \le 2$; $Li_aNi_{1-b-c}Mn_bB^1_cO_{2-\alpha}F^1_\alpha$ where $0.90 \le a \le 1.8$, $0 \le b \le 0.5$, $0 \le c \le 0.05$, and $0 \le 9\alpha \le 2$; $Li_aNi_{1-b-c}Mn_bB^1_cO_{2-\alpha}F^1_2$ where $0.90 \le a \le 1.8$, $0 \le b \le 0.5$, $0 \le c \le 0.05$, and $0 \le 9\alpha \le 2$; $Li_aNi_bE_cG_dO_2$ where $0.90 \le a \le 1.8$, $0 \le b \le 0.9$, $0 \le c \le 0.5$, and $0.001 \le d \le 0.1$; $Li_aNi_bCo_cMn_dGeO_2$ where $0.90 \le a \le 1.8$, $0 \le b \le 0.9$, $0 \le c \le 0.5$, $0 \le d \le 0.5$, and $0.001 \le e \le 0.1$; $Li_aNiG_bO_2$ where $0.90 \le a \le 1.8$ and $0.001 \le b \le 0.1$; $Li_aCoG_bO_2$ where $0.90 \le a \le 1.8$ and $0.001 \le b \le 0.1$; $Li_aMnG_bO_2$ where $0.90 \le a \le 1.8$ and $0.001 \le b \le 0.1$; $Li_aMn_2G_bO_4$ where $0.90 \le a \le 1.8$ and $0.001 \le b \le 0.1$; $QO_2$; $QS_2$; $LiQS_2$; $V_2O_5$; $LiV_2O_5$; $LiI^1O_2$; $LiNiVO_4$; $Li_{(3-f)}J_2(PO_4)_3 (0 \le f \le 2)$; $Li_{(3-f)}Fe_2(PO_4)_3 (0 \le f \le 2)$; and $LiFePO_4$.

In the formulae above, A may be selected from the group consisting of nickel (Ni), cobalt (Co), manganese (Mn), and combinations thereof; $B^1$ may be selected from the group consisting of aluminum (Al), Ni, Co, Mn, chromium (Cr), iron (Fe), magnesium (Mg), strontium (Sr), vanadium (V), a rare earth element, and combinations thereof; $D^1$ may be selected from the group consisting of oxygen (O), fluorine (F), sulfur (S), phosphorus (P), and combinations thereof; E may be selected from the group consisting of Co, Mn, and combinations thereof; $F^1$ may be selected from the group consisting of fluorine (F), sulfur (S), phosphorus (P), and combinations thereof; G may be selected from the group consisting of Al, Cr, Mn, Fe, Mg, lanthanum (La), cerium (Ce), strontium (Sr), vanadium (V), and combinations thereof; Q may be selected from the group consisting of titanium (Ti), molybdenum (Mo), Mn, and combinations thereof; $I^1$ may be selected from the group consisting of Cr, V, Fe, scandium (Sc), yttrium (Y), and combinations thereof; and J may be selected from the group consisting of V, Cr, Mn, Co, Ni, copper (Cu), and combinations thereof.

In some embodiments, the compounds described above as a cathode active material may have a coating layer at their surfaces. Also, a compound without a coating layer and a compound with a coating layer may be used in combination. In some embodiments, the coating layer may include a coating element compound, such as an oxide of a coating element, a hydroxide of a coating element, an oxyhydroxide of a coating element, an oxycarbonate of a coating element, or a hydroxy carbonate of a coating element. In some embodiments, the coating element compounds constituting the coating layer may be amorphous or crystalline. In some embodiments, the coating element included in the coating layer may be Mg, Al, Co, K, Na, Ca, Si, Ti, V, Sn, Ge, Ga, B, As, Zr, or a mixture thereof. A coating layer may be formed by using the coating elements in the aforementioned compounds by using any one of various methods that do not adversely affect physical properties of a cathode active material (e.g., spray coating or immersion).

In some embodiments, the cathode active material may be $LiNiO_2$, $LiCoO_2$, $LiMn_xO_{2x}$ where $x=1$ or $2$, $LiNi_{1-x}Mn_xO_2$ where $0 < x < 1$, $LiNi_{1-x-y}Co_xMn_yO_2$ where $0 \le x \le 0.5$ and $0 \le y \le 0.5$, $LiFeO_2$, $V_2O_5$, $TiS$, and $MoS$.

In some embodiments, the conductive agent, the binder, and the solvent used for the cathode active material composition may be the same as those used for the anode active material composition. In some embodiments, a plasticizer may be further added into the cathode active material composition and/or the anode active material composition to form pores in the electrode plates.

Amounts of the cathode active material, the conductive agent, the binder, and the solvent may be used at the same levels as commercially used in a lithium battery. In some embodiments, at least one of the conductive agent, the binder, and the solvent may not be included in the battery.

Next, a separator interposed between the cathode and the anode may be prepared. The separator may be any separator that is commonly used in lithium batteries. In particular, the separator may have low resistance to migration of ions in an electrolyte and may have a high electrolyte-retaining ability. Examples of the separator may include glass fiber, polyester, polyethylene, polypropylene, polytetrafluoroethylene (PTFE), and combinations thereof, each of which may be a nonwoven fabric or a woven fabric. For example, a windable separator such as polyethylene, polypropylene, or the like may be used for a lithium ion battery, and a separator that may retain a large amount of an organic electrolytic solution may be used for a lithium-ion polymer battery. For example, the separator may be prepared as follows:

A polymer resin, a filler, and a solvent are mixed to prepare a separator composition. In some embodiments, the separator composition may be directly coated on an electrode, and then dried to form a separator. In some embodiments, the separator composition may be cast on a support and dried, and a separator film separated from the support is then laminated on the electrode, thereby completing the preparation of a separator.

Any polymer resin that is commonly used for binding electrode plates in lithium batteries may be used without limitation. Examples of the polymer resin include a vinylidenefluoride/hexafluoropropylene copolymer, polyvinylidene fluoride (PVDF), polyacrylonitrile, polymethylmethacrylate, and mixtures thereof.

Next, an electrolyte is prepared.

For example, the electrolyte may be an organic electrolytic solution. In addition, the electrolyte may be in a solid form. Examples of the electrolyte include boron oxides, lithium oxynitride, and the like. The electrolyte is however not limited to the above examples, and may be any solid electrolyte used in the art. In some embodiments, the solid electrolyte may be formed on the anode by sputtering.

For example, an organic electrolytic solution may be prepared by dissolving a lithium salt in an organic solvent.

Any organic solvent used in the art may be used. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

Any lithium salt that is commonly used in the art may be used. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers of 1 to 20, respectively, LiCl, LiI, or a mixture thereof.

Figure 5:
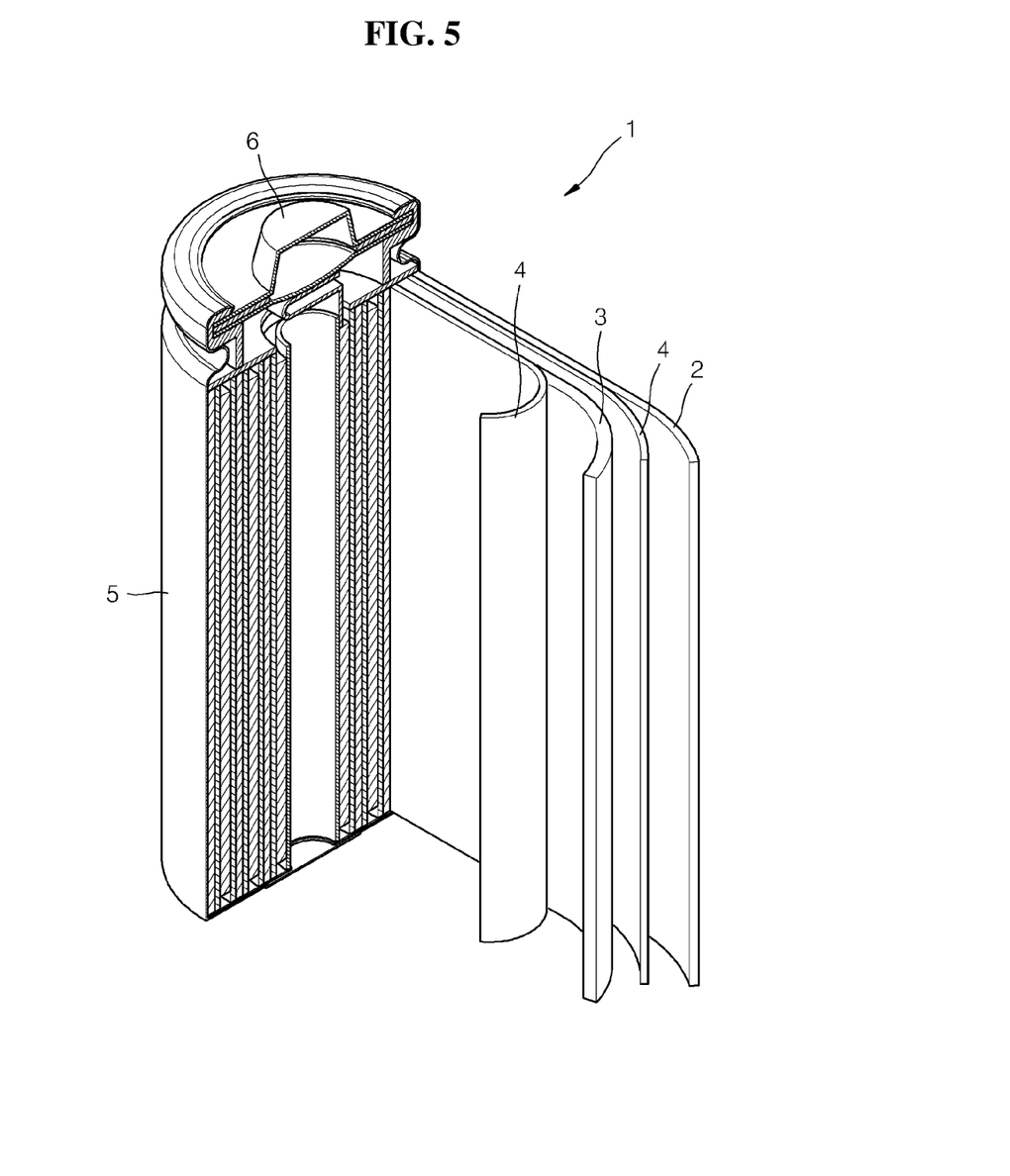
FIG. 5 is a schematic view of a lithium battery according to an embodiment.

FIG. 5 is a schematic view of a lithium battery 1 according to an embodiment. In reference to FIG. 5, the lithium battery 1 includes a cathode 3, an anode 2, and a separator 4. In some embodiments, the cathode 3, the anode 2, and the separator 4 may be wound or folded, and then accommodated in a battery case 5. Subsequently, an organic electrolyte is injected into the battery case 5, and the battery case 5 may be sealed by a cap assembly 6, thereby completing the manufacture of the lithium battery 1. In some embodiments, the battery case 5 may have a cylindrical shape, a rectangular shape, or a thin-film shape. In some embodiments, the lithium battery 1 may be thin-film-type battery. In some embodiments, the lithium battery 1 may be a lithium ion battery.

In some embodiments, the separator 4 may be disposed between the cathode 3 and the anode 2 to form a battery assembly. In some embodiments, a plurality of battery assemblies may be stacked in a bi-cell structure and impregnated into an organic electrolytic solution. The resultant is put into a pouch and hermetically sealed, thereby completing the manufacture of a lithium ion polymer battery.

In some embodiments, the plurality of battery assemblies may be stacked to form a battery pack, and such a battery pack may be used in any devices requiring high capacity and high-power output. For example, the battery pack may be used in notebook computers, smart phones, or electric vehicles (EVs).

In particular, the lithium battery 1 may have improved high rate characteristics and lifetime characteristics, and thus, the lithium battery may be applied to an EV, for example, in a hybrid vehicle such as plug-in hybrid electric vehicle (PHEV).

Some embodiments provide a method of preparing the composite anode active material including: mixing a first carbonaceous material that includes at least one carbon nanosheet, wherein the first carbonaceous material is crystalline, a non-carbonaceous material capable of intercalating and deintercalating lithium, a precursor of a second carbonaceous material, and a solvent to prepare a mixture slurry; spray-drying the mixture slurry to obtain a dried product; and sintering the dried product to obtain a composite anode active material. In some embodiments, the composite anode active material is a particle type composite anode active material. In some embodiments, the precursor of the second carbonaceous material comprises at least one selected from the group consisting of a polymer, coal tar pitch, petroleum pitch, mesophase pitch, coke, low molecular weight heavy oil, a coal-based pitch.

In some embodiments of the preparation method, the first carbonaceous material may be prepared by heat treating expandable graphite at a temperature ranging from about 300° C. to about 700° C. for about 0.1 hours to about 5 hours. In some embodiments, the heat treatment temperature may be, for example, in a range of about 400° C. to about 600° C., for example, in a range of 450° C. to about 550° C. In some embodiments, the heat treatment time may be, for example, about 0.5 hours to about 3 hours, for example, in a range of about 0.5 hours to about 2 hours.

In some embodiments, the expandable graphite may be obtained by dipping natural graphite, artificial graphite, carbon fibers, or spheroidal graphite in a strong acid solution such as sulfuric acid or hydrochloric acid for about 1 hour to about 24 hours. However, a method of preparing the expandable graphite is not limited thereto and any method enabling expandable graphite to be prepared may be used.

In some embodiments, the precursor of the second carbonaceous material may include at least one selected from the group consisting of a polymer, coal tar pitch, petroleum pitch, mesophase pitch, coke, low molecular weight heavy oil, a coal-based pitch, and derivatives thereof.

In some embodiments, the non-carbonaceous material capable of intercalating and deintercalating lithium may be at least one selected from the group consisting of Si, Sn, Pb, Ge, Al, $SiOx(0<x<2)$, $Li_4Ti_5O_{12}$, $TiO_2$, $LiTiO_3$, and $LiTiO_3$, and $Li_2Ti_3O_7$.

In the preparation method, the solvent used may not be particularly limited and may be any solvent that is easily evaporated at a temperature of 50° C. or higher. The solvent may be, for example, N-methylpyrrolidone, acetone, EtOH, or DI water.

In some embodiments, a solid content of the mixture slurry may be less than 45 wt %. In some embodiments, the solid content of the mixture slurry may be less than 40 wt %. In some embodiments, the solid content of the mixture slurry may be less than 35 wt %. In some embodiments, the solid content of the mixture slurry may be less than 30 wt %. In some embodiments, the solid content of the mixture slurry may be less than 25 wt %. In some embodiments, the solid content of the mixture slurry may be less than 20 wt %. In some embodiments, the solid content of the mixture slurry may be less than 10 wt %. When the solid content of the mixture slurry is too large, nozzles may clog during spray-drying or the viscosity of the mixture slurry is too high, and thus, the spray-drying process may not be satisfactorily performed.

In some embodiments of the preparation method, the spray-drying process may be performed at a temperature from about 50 to about 200° C. In some embodiments, the spray-drying temperature may be in a range of about 50 to about 150° C. In some embodiments, the spray-drying temperature may be in a range of about 80 to about 150° C. In some embodiments, the spray-drying temperature may be in a range of about 100 to about 140° C. When the spray-drying temperature is less than 50° C., the prepared composite anode active material powder may not be dried. In contrast, when the spray-drying temperature is greater than 200° C., it may be difficult to maintain the stability of the spray-drying conditions. In some embodiments, the spray-drying temperature may be an internal temperature of a chamber from which the slurry is sprayed, and a gas supplied to the chamber may have a temperature of 200° C. or higher.

In some embodiments, the sintering process may be performed in an inert atmosphere at a temperature of about 500° C. to 1000° C. for about 0.1 hours to about 10 hours. However, the sintering temperature is not limited thereto and may be any temperature that enables the formation of the second carbonaceous material by sintering a precursor thereof.

One or more embodiments will now be described in further detail with reference to the following examples. These examples are for illustrative purposes only and are not intended to limit the scope of the one or more embodiments.

EXAMPLES

Preparation of First Carbonaceous Material

Preparation Example 1

100 g of expandable graphite was expanded by heating at a temperature of 500° C. for 1 hour, and then a gas generated therefrom was exhausted through an exhaust outlet of an oven. The obtained product was dispersed in ethanol and ground using a homogenizer at 10,000 rpm for 10 minutes to afford a mixture. The mixture was further ground using a micro fluidizer, and then cleaned with ethanol after filtering using a filtering apparatus. Crystalline carbonaceous material powder was obtained by drying the filtered mixture in an oven at 120° C.

Figure 2A:
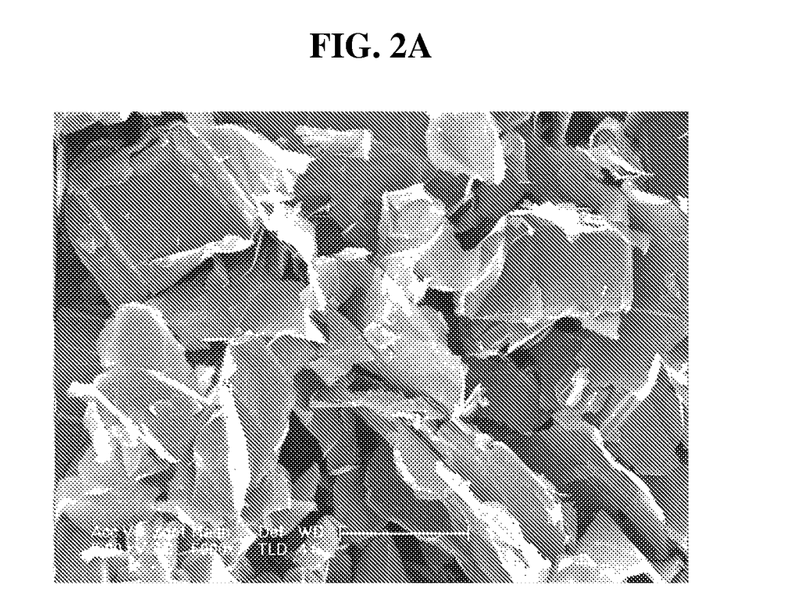
FIG. 2A is an SEM image of a crystalline first carbonaceous material prepared according to Preparation Example 1.

A scanning electron microscopic (SEM) image of the crystalline carbonaceous material powder is shown in FIG. 2A. In reference to FIG. 2A, it may be observed that individual crystalline carbonaceous material nanoparticles included in the crystalline carbonaceous material nanopowder have basically a "plate" shape.

Figure 2B:
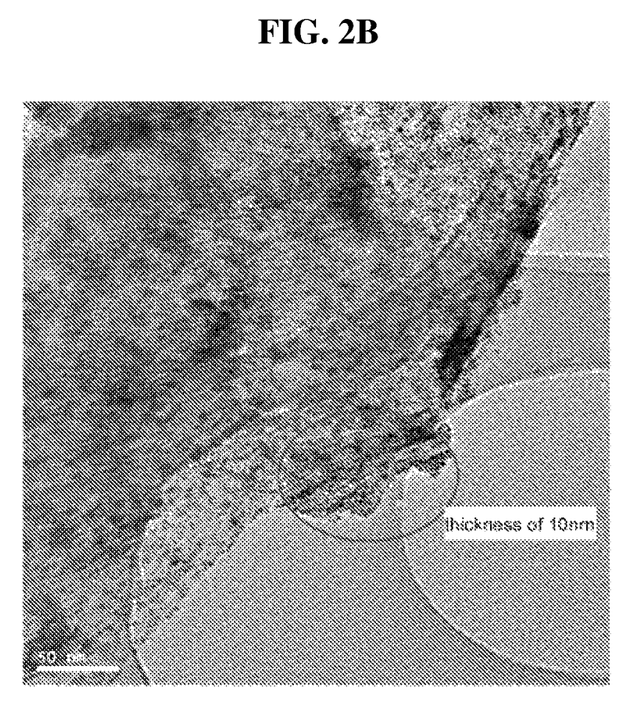
FIG. 2B is a transmission electron microscopic (TEM) image of the crystalline first carbonaceous material of Preparation Example 1.
Figure 3:
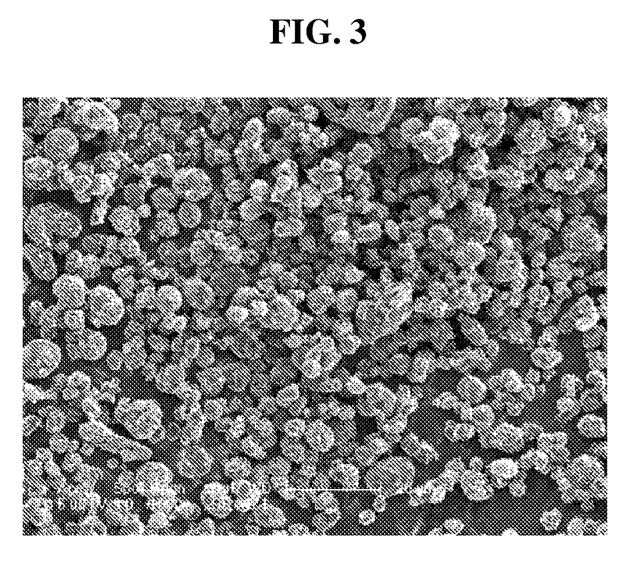
FIG. 3 is an SEM image of a composite anode active material powder prepared according to Comparative Example 1.

A transmission electron microscopic (TEM) image of nanoparticles in the crystalline carbonaceous material powder is shown in FIG. 2B. A portion in the circle is a portion corresponding to a side of the crystalline carbonaceous material nanoparticles having a plate shape shown in FIG. 2A and it may be observed that the thickness thereof is about 10 nm. Therefore, as shown in FIG. 2B, it may be observed that the crystalline carbonaceous material nanoparticle has r of about 10 nm where r is defined according to the discussion of FIG. 6.

Preparation of Composite Anode Active Material

Example 1

60 parts by weight of the first carbonaceous material nanoparticles prepared in Preparation Example 1, 30 parts by weight of Si nanoparticles having an average diameter of 300 nm, and 10 parts by weight of mesophase pitch (percentage of residual carbon: 72%) were added to 150 parts by weight of N-methylpyrrolidone as a solvent, and the resultant mixture was stirred by a homogenizer three times for 10 minutes each to prepare a slurry. Thereafter, the slurry was supplied to a spray dryer at a supply rate of 1 g/sec and sprayed therefrom in a chamber at 120° C. to obtain a spray-dried powder.

The spray-dried powder was sintered in a nitrogen atmosphere at 800° C. for 1 hour to prepare a composite anode active material powder.

Figure 1A:
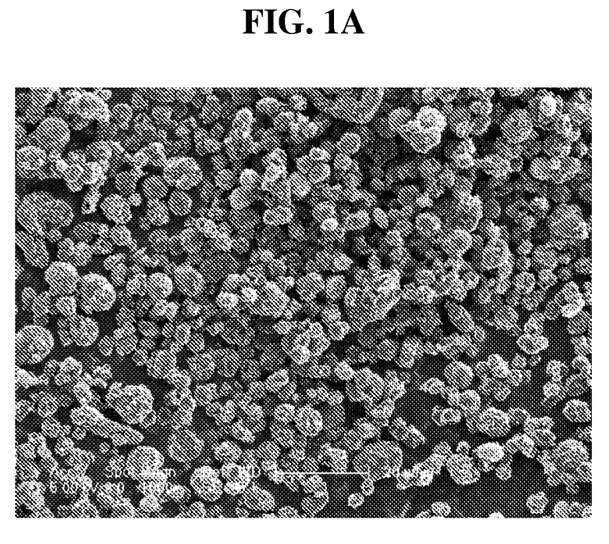
FIG. 1A is a scanning electron microscopic (SEM) image of a composite anode active material powder prepared according to Example 1.
Figure 1B:
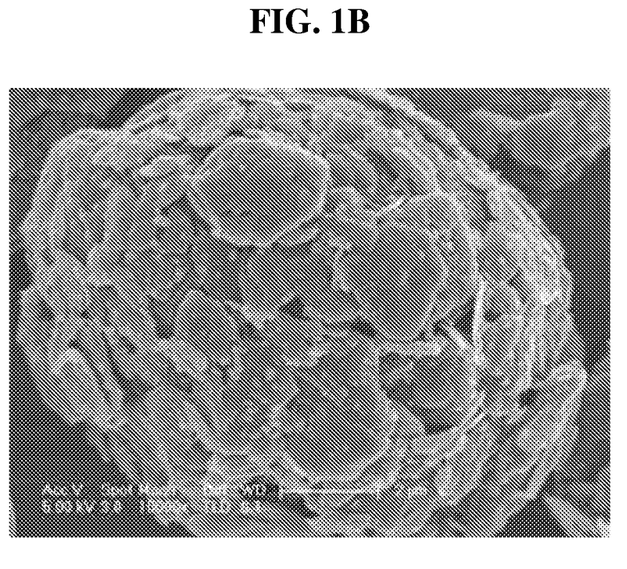
FIG. 1B is an enlarged view of FIG. 1A.
Figure 1C:
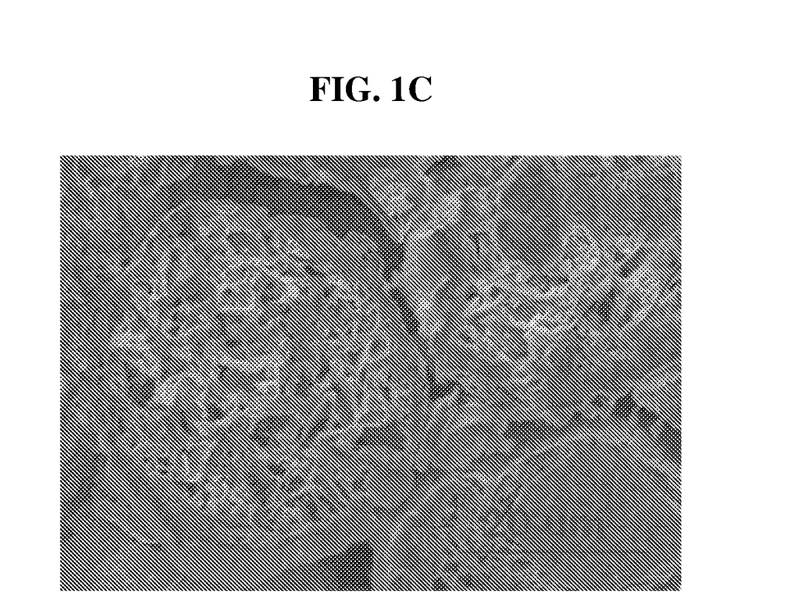
FIG. 1C is an SEM image illustrating a cross-section of particles of the composite anode active material powder of Example 1.

An SEM image of the composite anode active material powder prepared in Example 1 is shown in FIGS. 1A through 1C.

As shown in FIG. 1B, the composite anode active material has pores exposed at a surface thereof. In addition, as shown in FIG. 1C, a cross section of the composite anode active material particles includes a plurality of pores having a size of 50 nm or more and/or a plurality of non-spherical pores having a size of several micrometers.

An aspect ratio of the composite anode active material powder was 1 to 1.5, and an average diameter D50 of the composite anode active material particles was 12 µm.

A BET specific surface area of the composite anode active material powder through a nitrogen adsorption experiment was 55.64 m$^2$/g, a total volume of pores was 0.07 cm$^3$/g, and an average diameter of the pores (4V/A by BET) was 5.05 nm.

Comparative Example 1

60 parts by weight of the first carbonaceous material nanoparticles prepared in Preparation Example 1, 30 parts by weight of Si nanoparticles having an average diameter of 300 nm, and 10 parts by weight of mesophase pitch (percentage of residual carbon: 72%) were added to 180 parts by weight of N-methylpyrrolidone as a solvent, and the resultant solution was stirred by a homogenizer three times for 10 minutes each to prepare a slurry. Thereafter, the slurry was supplied to a spray dryer at a supply rate of 1 g/sec and sprayed therefrom in a chamber at 120° C. to obtain a spray-dried powder.

The spray-dried powder was sintered in a nitrogen atmosphere at 800° C. for 1 hour to prepare a composite anode active material powder.

The composite anode active material powder prepared in Comparative Example 1 had an average diameter D50 of 3 µm.

Example 2

60 parts by weight of the first carbonaceous material nanoparticles prepared in Preparation Example 1, 30 parts by weight of SiO$_x$ (where x=0.3) nanoparticles having an average diameter of 300 nm, and 10 parts by weight of mesophase pitch (percentage of residual carbon: 72%) were added to 150 parts by weight of N-methylpyrrolidone as a solvent, and the resultant solution was stirred by a homogenizer three times for 10 minutes each to prepare a slurry. Thereafter, the slurry was supplied to a spray dryer at a supply rate of 1 g/sec and sprayed therefrom in a chamber at 120° C. to obtain a spray-dried powder.

The spray-dried powder was sintered in a nitrogen atmosphere at 800° C. for 1 hour to prepare a composite anode active material powder.

The composite anode active material powder prepared in Example 2 had an average diameter D50 of 12 µm.

Comparative Example 2

60 parts by weight of the first carbonaceous material nanoparticles prepared in Preparation Example 1, 30 parts by weight of SiO$_x$ (where x=0.3) nanoparticles having an average diameter of 300 nm, and 10 parts by weight of mesophase pitch (percentage of residual carbon: 72%) were added to 180 parts by weight of N-methylpyrrolidone as a solvent, and the resultant solution was stirred by a homogenizer three times for 10 minutes each to prepare a slurry. Thereafter, the slurry was supplied to a spray dryer at a supply rate of 1 g/sec and sprayed therefrom in a chamber at 120° C. to obtain a spray-dried powder.

The spray-dried powder was sintered in a nitrogen atmosphere at 800° C. for 1 hour to prepare a composite anode active material powder.

The composite anode active material powder prepared in Comparative Example 2 had an average diameter D50 of 3 µm.

Manufacture of Anode and Lithium Battery

Example 3

A slurry was prepared such that the composite anode active material powder of Example 1 and polyvinylidenefluoride (PVdF) were mixed in N-methylpyrrolidone as a solvent at a weight ratio of the active material powder and PVdF of 94:6.

The active material slurry was coated on a Cu foil having a thickness of 10 µm to a thickness of 90 µm, dried at 135° C. for 3 hours, and pressed to a thickness of 70 µm to prepare an anode plate. Thereafter, a coin cell (CR2016 type) having a diameter of 32 mm was prepared.

Metallic lithium as a counter electrode, a polyethylene separator (STAR 20, Asahi Kasei, Japan), and an electrolyte solution including 1.15M LiPF$_6$ dissolved in a mixed solvent of ethylenecarbonate (EC), ethylmethylcarbonate (EMC) and diethylcarbonate (DEC) in a volume ratio of 3:3:4 were used.

Example 4

A lithium battery was manufactured in the same manner as in Example 3, except that the composite anode active material powder of Example 2 was used.

Comparative Example 3

A lithium battery was manufactured in the same manner as in Example 3, except that the composite anode active material powder of Comparative Example 1 was used.

Comparative Example 4

A lithium battery was manufactured in the same manner as in Example 3, except that the composite anode active material powder of Comparative Example 2 was used.

Evaluation Example 1

X-ray Diffraction (XRD) Experiment

XRD experiments were performed on the composite anode active material powders prepared in Examples 1 and 2 and Comparative Examples 1 and 2. CuK-α characteristic X-rays having a wavelength of 1.541 Å were used for the XRD experiments.

Figure 4:
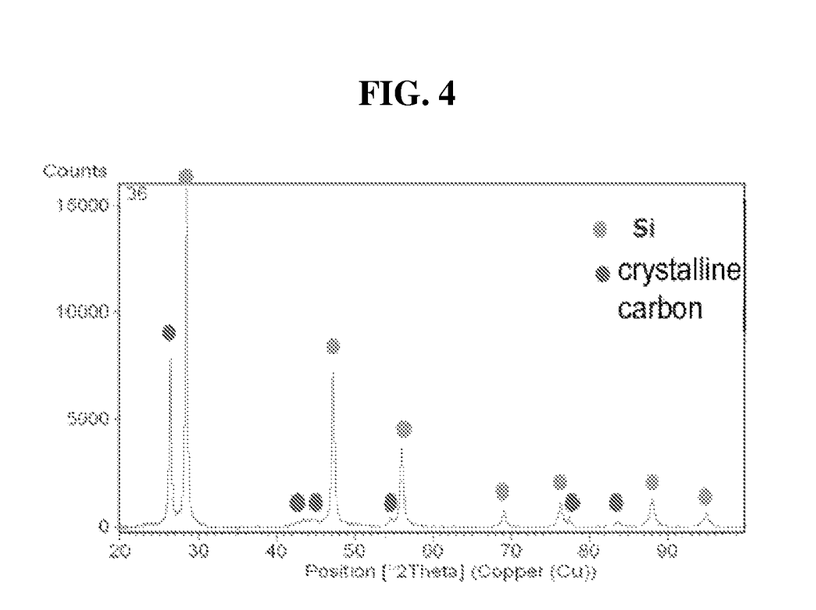
FIG. 4 is an X-ray diffraction (XRD) spectrum of the composite anode active material powder of Example 1.

As shown in FIG. 4, the composite anode active material particles of Example 1 showed a characteristic peak corresponding to the first carbonaceous material and a characteristic peak corresponding to Si.

A lattice spacing calculated from a peak corresponding to a first carbonaceous material included in the composite anode active material particles of Example 1 was 0.38 nm.

Evaluation Example 2

Evaluation of Charging and Discharging Characteristics

The coin cells of Examples 3~4 and Comparative Examples 3 and 4 were each charged with a constant current of 0.2 C rate at 25° C. until the voltage of the cell reached 0.01 V (vs. Li), and then at a constant voltage of 0.01 V until the current reached 0.01 C. Subsequently, the coin cell was discharged at a constant current of 0.2 C until the voltage reached 1.5 V (vs. Li).

Subsequently, each of the coin cells was charged with a constant current of 0.5 C rate until the voltage of the cell reached 0.01 V (vs. Li), and then at a constant voltage of about 0.01 V until the current reached 0.01 C, followed by discharging with a constant current of 0.5 C until the voltage reached about 1.5 V (vs. Li) (formation process).

Each of the cells after the formation process was charged with a constant current of 1.0 C rate at 25° C. until the voltage of the cell reached about 0.01 V (vs. Li), and then at a constant voltage of 0.01 V until the current reached 0.01 C, followed by discharging with a constant current of about 1.0 C until the voltage reached about 1.5 V (vs. Li). This cycle of charging and discharging was repeated 30 times.

The results of the charging/discharging test are shown in part in Table 1 below. A charge/discharge efficiency is represented by Equation 1 below, and a capacity retention rate is represented by Equation 2 below.

$$\text{Charge/discharge efficiency (\%)} = [\text{Discharge capacity}/\text{Charge capacity}] \times 100 \quad \text{Equation 1}$$

$$\text{Capacity retention rate (\%)} = [\text{Discharge capacity at 30th cycle}/\text{Discharge capacity at 1st cycle}] \times 100 \quad \text{Equation 2}$$

TABLE 1

| | Charge/discharge efficiency at 1st cycle [%] | Capacity retention rate at 30th cycle [%] | Discharge capacity at 30th cycle [mAh/g] |
|---|---|---|---|
| Example 3 | 83 | 92 | 1025 |
| Comparative Example 3 | 82 | 72 | 800 |
| Example 4 | 78 | 95 | 550 |
| Comparative Example 4 | 75 | 87 | 467 |

As shown in Table 1, the lithium battery of Example 3~4 exhibited a significantly improved initial efficiency, lifetime characteristics, and discharge capacity at high rates, compared to the lithium batteries of Comparative Examples 3 and 4 respectively.

As described above, according to the one or more of the above embodiments of the present invention, a composite anode active material includes particles including a first carbonaceous material with crystallinity, a non-carbonaceous material capable of intercalating and deintercalating lithium, and a second carbonaceous material, wherein the particles have pores having a size of 50 nm or more, and a lithium battery including the composite anode active material may have an improved initial efficiency, discharge capacity, and lifetime.

In the present disclosure, the terms "Example," "Comparative Example" and "Evaluation Example" are used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite anode active material comprising particles, wherein the particles each comprise:
    a first carbonaceous material that is substantially crystalline and comprises at least one carbon nano-sheet on a portion of a surface;
    a non-carbonaceous material capable of intercalating and deintercalating lithium; and
    a second carbonaceous material that binds the first carbonaceous material and the non-carbonaceous material, and
    wherein the particles each comprise pores having a size of 50 nm or more and less than 20 μm.

2. The composite anode active material of claim 1, wherein a cross-section of the particles comprises a non-spherical pore.

3. The composite anode active material of claim 1, wherein the pores are formed on a surface of the particles.

4. The composite anode active material of claim 1, wherein the particles have an average diameter D50 of 10 μm or more.

5. The composite anode active material of claim 1, wherein the particles have an average diameter D50 ranging from about 10 μm to about 100 μm.

6. The composite anode active material of claim 1, wherein the particles are spherical or oval particles having an aspect ratio of 3 or less.

7. The composite anode active material of claim 1, wherein the first carbonaceous material and the non-carbonaceous material are dispersed in the particles.

8. The composite anode active material of claim 1, wherein an amount of the non-carbonaceous material is in a range of more than 0 wt % to about 50 wt % based on a total weight of the particles.

9. The composite anode active material of claim 1, wherein the non-carbonaceous material comprises particles having a diameter from about 10 nm to about 5 µm.

10. The composite anode active material of claim 1, wherein the non-carbonaceous material comprises at least one selected from the group consisting of metals that are alloyable with lithium, alloys of the metals, and oxides of the metals.

11. The composite anode active material of claim 1, wherein the non-carbonaceous material comprises at least one selected from the group consisting of Si, Sn, Pb, Ge, Al, SiOx ($0<x\leq2$), $Li_4Ti_5O_{12}$, $TiO_2$, $LiTiO_3$, and $Li_2Ti_3O_7$.

12. The composite anode active material of claim 1, wherein the first carbonaceous material has a structure in which n polycyclic nano-sheets are stacked upon one another along a direction perpendicular to one plane, wherein each of the polycyclic nano-sheets comprises hexagonal rings of six carbon atoms linked to each other, and n is an integer from 2 to 250.

13. The composite anode active material of claim 1, wherein the second carbonaceous material comprises amorphous carbon.

14. The composite anode active material of claim 1, wherein the second carbonaceous material comprises a sintered product of a carbon precursor.

15. An anode comprising: a current collector; and the composite anode active material of claim 1.

16. A lithium battery comprising: a cathode; and the anode of claim 15.

* * * * *